Patented Feb. 19, 1929.

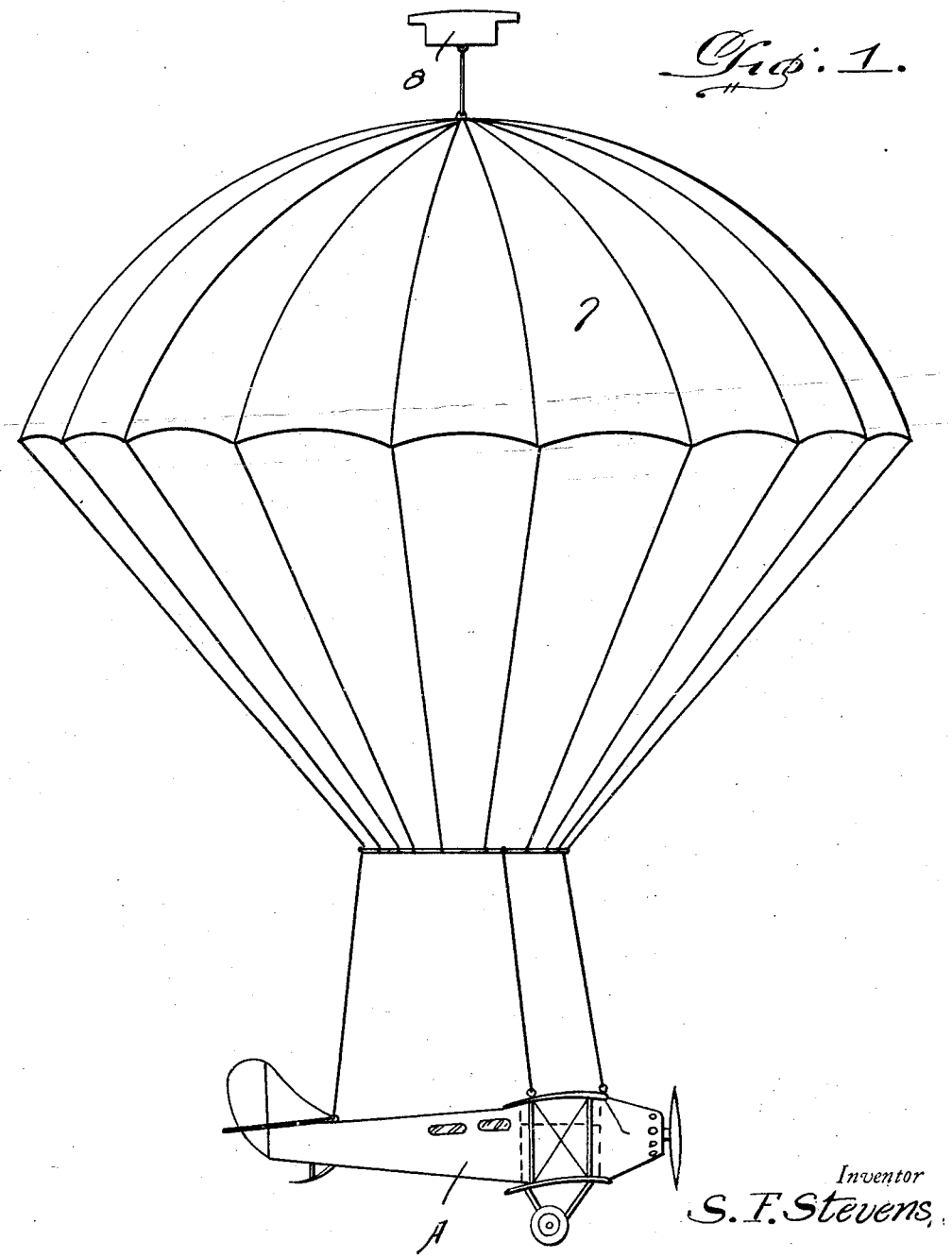

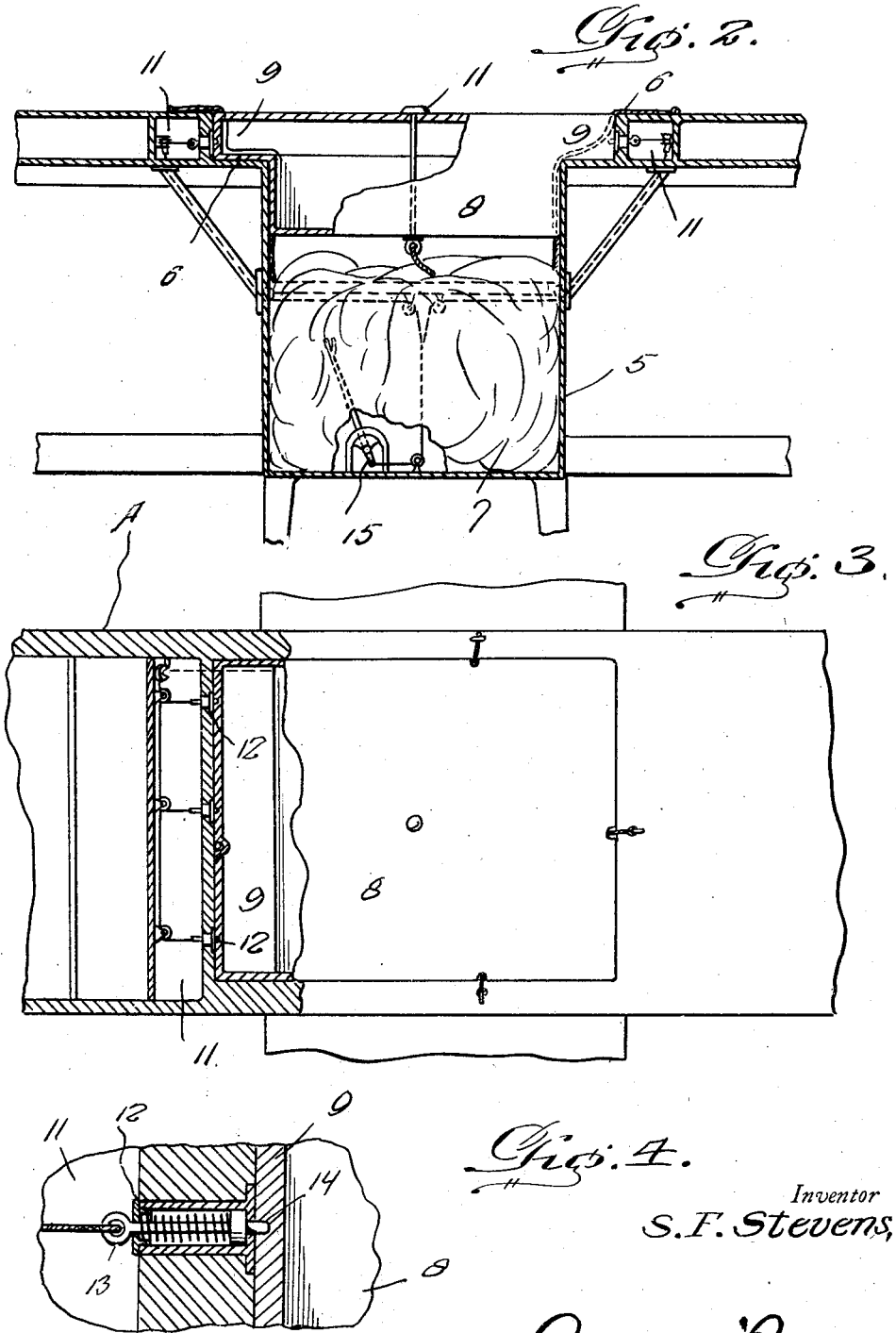

1,702,422

UNITED STATES PATENT OFFICE.

STEPHEN F. STEVENS, OF RUMSON, NEW JERSEY.

PARACHUTE EQUIPMENT FOR AEROPLANES.

Application filed April 18, 1928. Serial No. 270,984.

This invention relates to new and useful improvements in a parachute equipment for aeroplanes, and aims to provide a plane construction wherein the body or fuselage thereof is formed or equipped with a parachute receiving pocket open at its upper end and within which is normally mounted a gas filled closure for the pocket, which closure member is attached to the parachute body and normally locked in position within the pocket.

Furthermore the pressure of the gas within the closure should be sufficient to cause the rising of the closure member from the pocket when the same is released by the aviator for drawing the parachute out of the pocket, said parachute cords or cables being anchored at predetermined points to the aeroplane so that when the parachute body is spread, the plane will be supported so that its descent will be relatively slow, thus preventing the crashing of the plane and the killing of the aviator when the machine ceases to function properly.

An important object of this invention is to substantially improve and simplify aeroplane parachute equipment heretofore experimented with.

Furthermore, by reason of the gas filled closure for the parachute pocket, this closure will float upon the surface of a body of water and prevent the plane from sinking to the bottom of the water, said closure further providing a life raft for the aviator, should the ship fall in the water, thus supporting the aviator until assistance arrives.

In the drawings wherein like reference characters indicate corresponding parts throughout the several views:

Figure 1 is a side elevation of an aeroplane equipped with my improved parachute structure, the same being disclosed in extended position.

Figure 2 is a detailed fragmentary section through that portion of the ship provided with my parachute equipment.

Figure 3 is a fragmentary plan view partially in section of this portion of this ship, and Figure 4 is an enlarged detail fragmentary section disclosing one of the locking units for maintaining the parachute pocket closure in its position within the closure.

Now having particular reference to the drawing, A designates generally a conventional aeroplane construction, the body or fuselage of which in the present instance is formed or constructed at a predetermined point with a pocket 5 preferably of rectangular configuration open at its upper end, the body of the ship being constructed at the top of the pocket and at opposed ends thereof with channels 6—6.

Adapted for arrangement within this pocket 5 is a suitable parachute 7, while constructed for arrangement within the upper open end of this pocket is a hollow gas filled closure 8, the upper end thereof being formed with opposed hollow wings 9—9 for engagement within the said channels 6—6 of the plane construction. Extending through the center of this closure 8 is a pin 10, the inner end of which is attached to the center of the body of the parachute 7 in any suitable manner. At the said channels 6—6 the plane is constructed to provide boxings or compartments 11—11 within the outer walls of which are arranged suitable latch units 12, each of which includes a spring pressed latch bolt 13, the outer end of which is adapted for engagement within a socket 14 in the outer surface of the adjacent wall of the wing 9 of said gas filled closure 8 for obviously retaining the closure within the pocket.

The latch bolt of these latch units are all connected through the medium of cables to a common operating lever 15 arranged adjacent to the aviator's seat so that the swinging of the lever in a proper direction will release all the latch bolts, thus unlocking the closure whereupon the same will rise from the pockets resulting in the drawing of the parachute 7 therefrom.

The cord or cable structure of the parachute 7 is connected by suitable cables to certain predetermined points of the aeroplane A, these cords or cables extending upwardly through channels formed in the sides of the closure as in Figures 2 and 3.

Obviously, the provision of an equipment of this character will permit the slow descent of a disabled aeroplane while the provision of the gasfilled closure 8 will prevent the sinking of the ship to the bottom of a body of water, said closure being susceptible of floating upon the surface of the body of water, and at the same time providing a life raft for the aviator until assistance arrives.

Having thus described the invention, what I claim as new and desire to secure by Letters Patent is:—

1. In a parachute arrangement for aeroplanes wherein the plane fuselage is equipped or constructed with a parachute receiving pocket, a parachute arranged within the pocket, a gas filled closure arranged within the upper end of the pocket, and normally retaining the parachute therein, a connection between the closure and the body of the parachute, cable connections between the parachute and the aeroplane body, means normally locking the closure within the pocket, and means whereby the closure may be quickly released whereupon it will raise from the pocket and draw the parachute therefrom.

2. In a parachute equipment for aeroplanes wherein the body of the plane is constructed with a pocket, a parachute arranged within the pocket, a lighter-than-air closure arranged within the pocket above the parachute, and connected thereto, connections between the parachute and the body of the plane, and quick releasable means for retaining the closure within the pocket.

3. In a parachute equipment for aeroplanes wherein the body of the plane is constructed with a pocket, a parachute arranged within the pocket, a lighter-than-air closure arranged within the pocket above the parachute, and connected thereto, connection between the parachute and the body of the plane, and quick releasable means for retaining the closure within the pocket, said means consisting of latch members associated with the body, and adapted for engagement with the closure, and manually controlled means whereby the latches may be released.

In testimony whereof I affix my signature.

STEPHEN F. STEVENS.